United States Patent
Park

(10) Patent No.: US 6,175,491 B1
(45) Date of Patent: Jan. 16, 2001

(54) LOCKING DEVICE AND METHOD FOR PERIPHERAL DEVICES

(75) Inventor: Hong-Kil Park, Suwon (KR)

(73) Assignee: Samsung Electronics Co. Ltd., Suwon (KR)

( * ) Notice: Under 35 U.S.C. 154(b), the term of this patent shall be extended for 0 days.

(21) Appl. No.: 09/037,526

(22) Filed: Mar. 10, 1998

(30) Foreign Application Priority Data

Mar. 10, 1997 (KR) .................................................... 97-7891

(51) Int. Cl.[7] .............................. G06F 1/16; G06F 13/00; H05K 5/00
(52) U.S. Cl. .......................... 361/686; 361/683; 361/726; 361/747; 361/759; 395/282; 70/58
(58) Field of Search .................................... 361/686, 683, 361/684, 726, 747, 759; 395/281–283; 70/157, 58, 59

(56) References Cited

U.S. PATENT DOCUMENTS

| | | |
|---|---|---|
| 4,214,172 | 7/1980 | See . |
| 4,669,281 | 6/1987 | Young . |
| 4,941,841 | 7/1990 | Darden et al. . |
| 5,220,815 | 6/1993 | Davidge et al. . |
| 5,228,319 | 7/1993 | Holley et al. . |
| 5,313,596 * | 5/1994 | Swindler et al. ..................... 361/725 |
| 5,323,291 * | 6/1994 | Boyle et al. .......................... 361/683 |
| 5,347,425 * | 9/1994 | Herron et al. ........................ 361/683 |
| 5,477,415 * | 12/1995 | Mitcham et al. ..................... 361/686 |
| 5,510,955 | 4/1996 | Taesang . |
| 5,526,493 * | 6/1996 | Shu ....................................... 395/281 |
| 5,587,878 | 12/1996 | Tsai et al. . |
| 5,612,927 * | 3/1997 | Morrison et al. ..................... 361/685 |
| 5,619,398 * | 4/1997 | Harrison et al. ...................... 361/686 |
| 5,737,185 * | 4/1998 | Morrison et al. ..................... 361/685 |
| 5,737,541 * | 4/1998 | Shimizu et al. ....................... 395/281 |
| 5,740,012 * | 4/1998 | Choi ...................................... 361/686 |
| 5,751,546 * | 5/1998 | Clark et al. ........................... 361/686 |
| 5,790,375 * | 8/1998 | Lee ....................................... 361/686 |
| 5,825,616 * | 10/1998 | Howell et al. ........................ 361/684 |
| 5,870,283 * | 2/1999 | Maeda et al. ......................... 361/686 |
| 5,875,307 * | 2/1999 | Ma et al. .............................. 395/281 |
| 5,933,321 * | 8/1999 | Ruch et al. ........................... 361/686 |
| 6,005,769 * | 12/1999 | Cho ...................................... 361/686 |
| 6,008,992 * | 12/1999 | Kawakami ........................... 361/726 |
| 6,034,869 * | 3/2000 | Lin ....................................... 361/686 |

* cited by examiner

Primary Examiner—Leo P. Picard
Assistant Examiner—Lisa Lea-Edmonds
(74) Attorney, Agent, or Firm—Robert E. Bushnell, Esq.

(57) ABSTRACT

A computer system having a central processing unit, a memory, a system bus and an input/output controller, comprises: a power supply for supplying power to a computer system; a control block for generating a locking control signal according to a state of a power control signal inputted for controlling an operation state of the power supply; and a removable locking mechanism for performing a locking operation to make a peripheral device not be separated from the computer system, according to the locking control signal. A peripheral device can not be separated from the computer system, thereby preventing the computer system and the peripheral device from being damaged since a removable locking device of peripheral device is locked when power is applied to the computer system.

18 Claims, 3 Drawing Sheets

LOCKING DEVICE AND METHOD FOR PERIPHERAL DEVICES

CLAIM OF PRIORITY

This application makes reference to, incorporates the same herein, and claims all rights accruing thereto under 35 U.S.C. § 119 through my patent application entitled A Removable Locking Device of Peripheral Devices and a Computer System Having the Same and a Control Method Thereof earlier filed in the Korean Industrial Property Office on the 10th day of Mar. 1997 and there duly assigned Ser. No. 1997/7891.

BACKGROUND OF THE INVENTION

1. Field of the Invention

The present invention relates to a removable locking device for peripheral devices and, more specifically, a removable computer peripheral locking device and a method for preventing removable peripheral devices from being removed from the computer while the power is on.

2. Background Art

A typical peripheral device is attached through a peripheral port on a computer and is prevented from accidentally separating from the computer by a safety device, such as a rib on the bottom or on the side of the computer. The extra space required for mounting a specific peripheral safety device is becoming an increasingly difficult design problem as computers are being built progressively more compactly due to increasing technological demands. Many computers are capable of interfacing with a wide variety of peripheral devices, thus providing computer users with greater freedom in the selection of additional peripheral devices for their computers.

This has led to the development of different ways to prevent a peripheral device, such as a hard disk driver, a floppy disk driver, and a cable master, from accidentally disconnecting from a computer. Generally, a user should separate removable peripheral devices from the main body of a computer system after turning OFF the power supply of the computer system. Some techniques developed to prevent the separation of peripheral devices from a computer are shown, for example, in U.S. Pat. No. 4,214,172 to See entitled Interlock for Power Sources in Data Processing Apparatus, U.S. Pat. No. 4,669,281 to Young entitled Cable/Computer Peripheral Lock, U.S. Pat. No. 4,941,841 to Darden entitled Adapter and a Removable Slide-In Cartridge for an Information Storage System, U.S. Pat. No. 5,220,815 to Davidge entitled Device-Port Locking Covers, U.S. Pat. No. 5,477,415 to Mitcham entitled Automatic Computer Docking Station Having a Motorized Tray, Cammed Side Connectors, Motorized Side Connectors, and Locking and Unlocking Guide Pins, U.S. Pat. No. 5,228,319 to Holley entitled Desktop Computer Locking Assembly, U.S. Pat. No. 5,510,955 to Taesang entitled Cage in Computer Equipment for Locking Peripheral Equipment Therewithin Using Hooked Lockpins, and U.S. Pat. No. 5,587,878 to Tsai entitled Anti-Theft Mechanism in a Computer System Having Removable Modules.

Contemporary techniques for securing peripheral devices often allow a peripheral device to be removed from a computer while the computer's power is still on. This can result in damaging the peripheral device and temporarily preventing further use of the computer. I believe it may be possible to improve on the contemporary art by providing a peripheral device locking system and method that prevents peripheral devices from being separated from a computer while the power is on, that is economical to manufacture, that can be retrofitted onto existing peripheral devices, that avoids the loss of data due to accidental disconnections, and that avoids damage to the computer due to accidental disconnections.

SUMMARY OF THE INVENTION

Accordingly, it is an object of the present invention to provide an improved peripheral locking device and method.

It is another object to provide a peripheral locking device that prevents the removal of peripheral devices while the power to the computer is on.

It is still another object to provide a peripheral locking and device and method that is economical to manufacture.

It is yet another object to provide a peripheral locking device and method that can be retrofitted onto existing peripheral devices and computers.

It is still yet another object to provide a peripheral locking device and method that can prevent the loss of data due to accidental disconnections of the peripheral device from the computer while the power is on.

It is a further object to provide a peripheral locking device and method that can prevent the damage to the computer system resulting from accidental removal of the peripheral device from the computer while the power is on.

To achieve these and other objects a removable locking device of peripheral devices may be constructed using a controller for generating a locking signal according to a power control signal inputted into a computer system. The controller manipulates a first locking mechanism located on the main body of the computer. The controller causes the first locking mechanism to perform either a locking operation or a locking release operation in response to a signal sent by the controller. A second locking mechanism is located on a peripheral device that can be separated from the main body of the computer system. To secure a peripheral device the first locking mechanism inserts a pin through a hole in a plate attached to the main body and into a hole in a plate attached to the peripheral device. The second locking mechanism is a plate that has a hole through it for engaging the pin. When the peripheral is to be removed the pin must first be withdrawn from the second locking mechanism.

The process of securing a peripheral device to a computer starts with detecting whether a power on signal, a resume signal, a suspend signal, or a power off signal is sent to the power supply. When a power on signal is sent to the power supply, the controller generates a locking signal that is sent to a motor. This causes a hook to be moved through attached rings in the peripheral device and the main body of the computer, thus securing the peripheral device to the computer. Then the power supply is turned on. When a resume signal is sent the peripheral device is secured to the main body of the computer and power is then turned on and back up data is reloaded onto the computer.

When a suspend signal is detected the computer stores all its data in memory and then releases the peripheral locking device and the power is turned off. When a power off signal is detected the controller sends a locking release signal to the motor. This causes the motor to withdraw the hook from the holes in the first and second plates or rings in the peripheral device and main body to allow the peripheral device to be removed. Then, the power supply to the computer is turned off.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
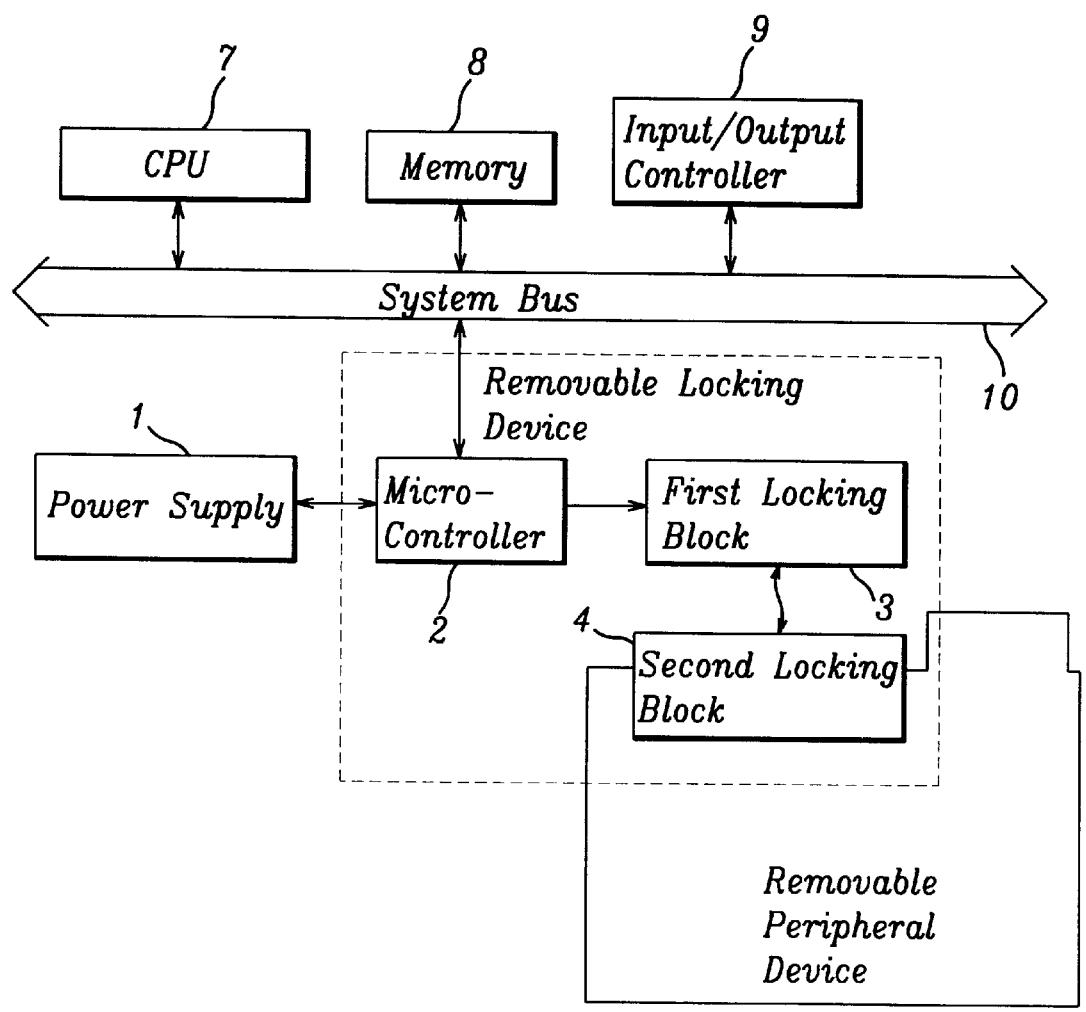
FIG. 1 is a block diagram illustrating a removable locking device for peripheral devices and a computer system as constructed according to the principles of the present invention.

Turning now to the drawings, FIG. 1 shows a peripheral device locking device for a computer. Central processing unit 7 and memory 8 and input/output controller 9 are all connected by system bus 10. Also attached to the system bus is a removable locking device that may be constructed of micro-controller 2 located on a main body of the computer that generates a locking signal depending on a power control signal that is entered to manipulate power supply 1. First locking mechanism 3, located on the main body of the computer system, performs the locking operation and the locking release operation. Second locking mechanism 4 located at a peripheral device which can be separated from the main body of the computer system, and completing the locking operation or the locking release operation corresponding to the locking operation or the locking release operation of the first locking mechanism 3.

Figure 3:
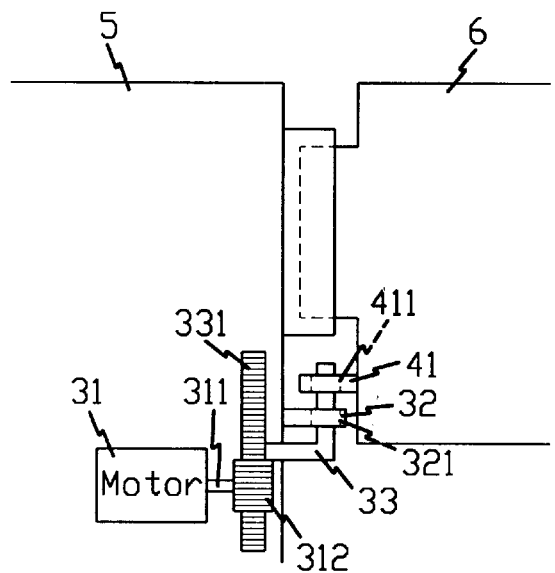
FIG. 3 is a perspective view of the removable locking device of FIG. 1 in a locked position.

As shown in FIG. 3, the first locking mechanism may be constructed with motor 31 mounted on main board 5. Motor 31's direction of rotation is changed in response to the locking state control signal outputted from micro-controller 2. First locking plate 32 is mounted on main board 5 and has locking groove 321. Locking hook 33 is used for controlling the locking state of peripheral device 6 by changing the mounting/dismounting state with locking groove 321 that is positioned on first locking plate 32 and second locking mechanism 4 according to the rotation direction of the motor 31. Second locking mechanism 4 includes second locking plate 41 that is mounted on removable peripheral devices 6 and has a bore 411 that can be engaged with locking hook 33.

Figure 4:
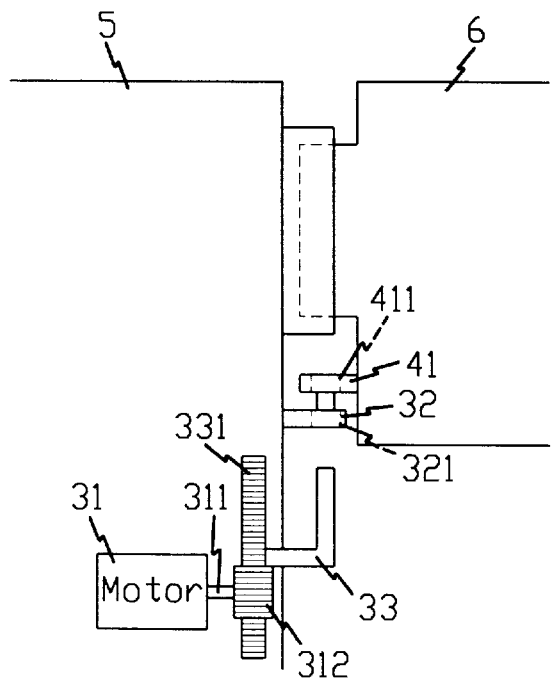
FIG. 4 is a perspective view illustrating the removable locking device of FIG. 1 in an unlocked position.

As also shown in FIG. 4, motor 31 and locking hook 33 are linked by gear 312 that is mounted on shaft 311 of motor 31 and rack 331 formed on one side of locking hook 33. Locking hook 33 is moved in response to the rotation of motor 31, and the movement direction of locking hook 33 is opposite to the rotational direction of motor 31.

Figure 2:
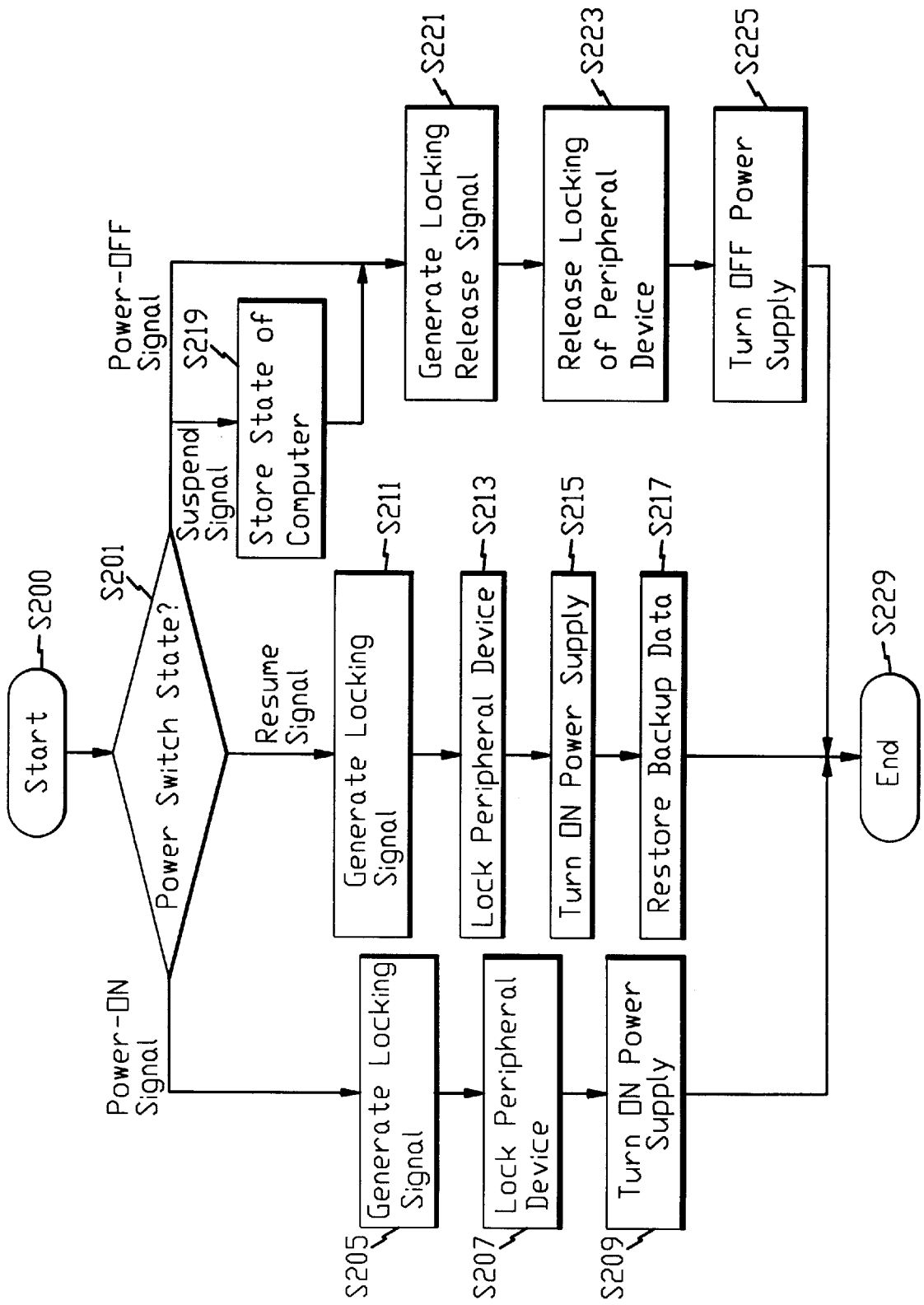
FIG. 2 is a flowchart of a method for controlling the locking device of FIG. 1.

A process is shown in FIG. 2 that controls the peripheral locking device of the present invention. When the operation of the locking device for the peripheral device is started, micro-controller 2 determines the power control signal sent by a power switch (not shown) and a power management program, during step S201.

Then, when the power switch is turned ON and the power-ON signal is outputted as the power control signal, micro-controller 2 rotates motor 31 of first locking mechanism 3 to the right by outputting the locking control signal, during step S205. If motor 31 is rotated to the right, gear 312 that is mounted on the shaft of motor 31 is rotated to the right and rack 331 is moved to the left. Thus, locking hook 33 is moved to the left and inserted into both locking groove 321 which may be constructed as a through bore, in first locking plate 32 that is mounted on main board 5 and locking groove 411, which maybe constructed as a through bore, of second locking plate 41 that is mounted on peripheral device 6. This locks peripheral device 6 into the computer system as illustrated in FIG. 3. Then, micro-controller 2 outputs the power-ON signal to power supply 1, and power supply 1 is turned ON, during step S209.

Then, during step S211, a resume signal is sent by the power management program as the power control signal. This causes micro-controller 2 to rotate motor 31 of first locking mechanism 3 to the right by outputting the locking control signal.

If motor 31 is rotated to the right, gear 312 that is mounted on shaft 311 of motor 31 is rotated to the right and rack 331 is moved to the left. Thus, locking hook 33 is moved to the left and inserted into the locking bore 321 in first locking plate 32 mounted on mainboard 5 and locking bore 411 in second locking plate 41. This locks peripheral device 6 into the computer system, during step S213. Then, during step S215, micro-controller 2 sends a power-ON signal to power supply 1, power supply 1 is turned ON. Then, during step S217, when the power is applied to the computer system, micro-controller 2 restores the operational state of the computer system to the state the computer was in before hibernation by restoring all the data that had been stored in a backup format before suspending computer operations. As described above, the user can not separate the peripheral device from the computer system since the locking hook 33 engages the locking grooves 321 and 411 of the first and the second locking plates 32 and 41 when the power-ON signal or the resume signal is outputted as the power control signal.

When a suspend signal is detected, during step S219, micro-controller 2 stores the present operational state of the portable computer in memory and outputs a locking release signal, during step S221, to motor 31 of main board 5. A suspend signal can be caused by a lack of any actions being entered into the computer system. Such as when no signals or data is received from the peripheral devices such as a keyboard, a mouse, a hard disk driver and a floppy disk driver.

Then motor 31 is rotated to the left, causing gear 312 that is mounted on shaft 311 of motor 31 to also be rotated to the left. This causes rack 331 to be moved to the right. This causes locking hook 33 to be moved to the right and withdrawn from both locking bore 321 in first locking plate 32 mounted on main board 5 and locking bore 411 in second locking plate 41, during step S223. According to this operation, the locking of the peripheral device 6 is released as illustrated in FIG. 4. Micro-controller 2 outputs a power-OFF signal to power supply 1, and power supply 1 is turned OFF, during step S225.

Then, when a power off signal is detected, micro-controller 2 rotates the motor 31 in the first locking mechanism 3 to the right by outputting the locking release signal, during step S221. If motor 31 is rotated to the left, gear 312 that is mounted on shaft 311 of motor 31 is rotated to the left and rack 331 is moved to the right. Thus, locking hook 33 is moved to the right and separated from both locking bore 321 in first locking plate 32 that is mounted on main board 5 and locking groove 411 in second locking plate 41, during step S223. According to this operation, the locking of the peripheral device 6 is released as illustrated in FIG. 4. Micro-controller 2 outputs a power-OFF signal to power supply 1, and power supply 1 is turned OFF, during step S225.

As described above, the user can easily separate peripheral device 6 from the computer system since locking hook 33 is separated from locking bores 321 and 411 in first and second locking plates 32 and 41 if the suspend signal or the power-OFF signal is generated as the power control signal.

The peripheral device is not limited to hard disk drives, but can be used for any modular memory unit, a modem, a printer, a monitor, etc. In addition, by preventing the peripheral device from being separated from the computer system, accidental damage and data loss are avoided.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A device for locking a peripheral component to a computer, said device comprising:

said computer having an input means, a display device, and a main body containing a central processing unit, said peripheral component, and a plurality of memory, said peripheral component being removable from said main body of said computer;

a controller generating a locking-signal when a power-on signal is sent to a power supply and generating a locking-release-signal when a power-off-signal is sent to said power supply;

a first locking mechanism being located on said main body of said computer system, said first locking mechanism comprising:

a motor mounted on a main board of said computer driving a shaft in either one of a forward direction and a reverse direction;

a first locking plate mounted on said main body and having a bore; and a locking hook having an L-shape and being attached to a rack having a plurality of gear teeth;

a gear driven by said motor via said shaft, said gear engaging said rack and moving said rack supporting said locking hook in a direction depending on a direction of rotation of said motor; and said locking hook being engageable with said first locking plate when a distal end of said locking hook is inserted through said bore in said first locking plate;

a second locking mechanism comprising a second locking plate having a hollow and being located on said peripheral component, said second locking mechanism being engageable with said first locking mechanism by inserting said locking hook through said bore in said first locking plate and through said hollow in said second locking plate;

said first mechanism engaging said second mechanism when said first mechanism receives said locking-signal from said controller and preventing the removal of said peripheral component from said main body of said computer; and said first mechanism disengaging from said second mechanism when said locking-release-signal is received from said controller and allowing said peripheral component to be removed from said main body of said computer.

2. The device of claim 1, with said controller generating said locking-signal when either one of said power-on signal and a resume-signal is detected.

3. The device of claim 1, with said controller generating said locking-release-signal when any one of a suspend-signal and said power-off-signal is detected.

4. The device of claim 1, further comprised of:

said motor and said locking hook being linked by said gear mounted on said shaft of said motor; and said rack being attached on one side of said locking hook and said locking hook moving in response to the rotation of said motor.

5. A process for controlling the removal of a peripheral component from a computer, said process comprising the steps of:

determining when any one of a power-on-signal, a resume-signal, a suspend-signal, and a power-off-signal is being sent to a power supply for said computer, said computer comprising an input means, a display device, and a housing containing a central processing unit, a power supply, and a memory, said peripheral component removably engaging said computer;

when said power-on-signal is detected, performing the steps of:
        generating a locking signal;
        locking said peripheral component into an operational engagement with said computer; and
        activating said power supply for said computer;

when said resume-signal is detected, performing the steps of:
        generating said locking signal;
        rotating a gear to move a rack supporting a locking hook in a first direction with said rack moving until said hook passes through a bore in a first plate and engages a hollow in a second plate attached to said peripheral component;
        activating said power supply; and
        restoring a plurality of back-up data;

when said suspend-signal is detected, performing the steps of:
        storing data being currently used by said computer;
        generating a lock release signal;
        rotating said gear to move said rack supporting said locking hook in a second direction opposite from said first direction;
        said rack moving until said hook is withdrawn from both said bore in said first plate and from said hollow in said second plate; and
        deactivating said power supply for said computer; and when a power-off-signal is detected, performing the steps of:
        generating said lock release signal;
        rotating said gear to move said rack supporting said locking hook in a second direction opposite from said first direction, with said rack moving until said hook is disengaged from both said bore in said first plate and from said hollow in said second plate; and
        deactivating said power supply for said computer.

6. The process of claim 5, with said computer further comprising:

mounting a motor on a main board of said computer to drive said shaft in either one of a forward direction and a reverse direction;

mounting said first locking plate on the main board; and mounting said gear to be driven by said shaft to move said rack in a direction determined by direction of rotation of said motor.

7. The device of claim 6, further comprised of:

said motor and said locking hook being linked by said gear mounted on said shaft of said motor;

said rack being attached on one side of said locking hook and said locking hook moving in response to the rotation of said motor.

8. A device for removably locking a peripheral component to a computer, said device comprising:

said computer having an input means, a display device, a main body containing a central processing unit, a power supply, and a memory, said peripheral component being removable from said main body of said computer;

a controller generating a locking signal when a power on signal is sent to said power supply and generating a locking release signal when a power off signal is sent to said power supply;

a first mechanism located on said main body of said computer system;

a second mechanism removably engageable with said first mechanism, said second mechanism being mounted on said peripheral component;

said first mechanism engaging said second mechanism in response to reception by said first mechanism of said locking signal from said controller and preventing removal of said peripheral component from said main body of said computer; and said first mechanism disengaging from said second mechanism in response to reception by said first mechanism of said locking release signal from said controller and allowing said peripheral component to be removed from said main body of said computer.

9. The device of claim 8, with said first mechanism further comprising:

a motor mounted on a main board of said computer driving a shaft in either one of a forward direction and a reverse direction;

a first locking plate mounted on said main body perforated by a bore; and a locking hook;

a rack having a plurality of gear teeth supporting said hook;

a gear driven by said shaft, moving said rack and said locking hook in a direction depending on a direction of rotation of said motor; and said hook engaging said first locking plate when a distal end of said hook is inserted through said bore in said first locking plate.

10. The device of claim 9, with said second mechanism comprising a second locking plate bearing a hollow, said hook engaging said second locking plate by insertion of said distal end of said hook through said first locking plate and through said second locking plate.

11. The device of claim 10, further comprised of:

said motor and said hook being linked by said gear mounted on said shaft of said motor;

said rack being attached on one side of said hook and said hook moving in response to the rotation of said motor.

12. The device of claim 8, with controller generating a locking-signal when either one of a power-on signal and a resume-signal is detected.

13. The device of claim 8, with said controller generating a locking-release-signal when any one of a suspend-signal and a power-off-signal is detected.

14. The device of claim 8, further comprised of said first mechanism engaging said second mechanism while said peripheral component is in an operative engagement with said computer.

15. The device of claim 8, further comprised of said first mechanism disengaging said second mechanism while said peripheral component is in an operative engagement with said computer.

16. The device of claim 8, further comprised of:

said first mechanism engaging said second mechanism while said peripheral component is in an operative engagement with said computer; and said first mechanism disengaging said second mechanism while said peripheral component is in said operative engagement with said computer.

17. The device of claim 8, with said first mechanism further comprising:

a motor mounted on a main board of said computer driving a shaft in opposite directions;

a first locking plate perforated by a bore, mounted on said main body; and a hook driven by said motor to move in a direction determined by a direction of rotation of said motor, and to extend through said bore and complete and engagement between said first mechanism and said second mechanism in response to said reception by said first mechanism of said locking signal from said controller.

18. The device of claim 8, with said first mechanism further comprising:

a motor mounted on a main board of said computer driving a shaft in opposite directions;

a first locking plate perforated by a bore, mounted on said main body; and a hook driven by said motor to move in a direction determined by a direction of rotation of said motor, and to extend through said bore and complete and engagement between said first mechanism and said second mechanism in response to said reception by said first mechanism of said locking signal from said controller, and to withdraw from said bore and disengage said first mechanism from said second mechanism in response to reception by said first mechanism of said locking release signal from said controller.

* * * * *